United States Patent [19]

Wesselhoft et al.

[11] 3,998,607
[45] Dec. 21, 1976

[54] ALKALI METAL CATALYST RECOVERY PROCESS

[75] Inventors: Robert D. Wesselhoft, Baytown; Charles J. Vadovic, LaPorte, both of Tex.

[73] Assignee: Exxon Research & Engineering Co., Linden, N.J.

[22] Filed: May 12, 1975

[21] Appl. No.: 576,817

[52] U.S. Cl. .................. 48/197 R; 23/293 R; 48/210; 252/413; 252/414; 252/420; 423/206 R; 423/658.5

[51] Int. Cl.² .................. C10J 3/06; C10J 3/54

[58] Field of Search ............. 48/197 R, 202, 203, 48/206, 209, 210; 252/373, 420, 412, 413; 423/208, 658.5, 206, 206 T; 23/270 R, 293 R

[56] References Cited
UNITED STATES PATENTS

| | | | |
|---|---|---|---|
| 875,425 | 8/1906 | Gillies ........................... | 23/270 R |
| 1,244,884 | 10/1917 | Nagelvoort .................... | 23/270 R |
| 2,381,965 | 8/1945 | Berry ............................. | 23/270 R |
| 2,614,911 | 10/1952 | Bonotto ......................... | 23/270 R |
| 2,743,999 | 5/1956 | Binswanger ................... | 423/208 |
| 2,845,936 | 8/1958 | Boynton et al. ............... | 23/270 R |
| 3,328,120 | 6/1967 | Mini .............................. | 423/208 |
| 3,615,299 | 10/1971 | Fischer et al. ................. | 48/202 |
| 3,681,013 | 8/1972 | Fish ............................... | 23/270 R |
| 3,847,567 | 11/1974 | Kalina et al. .................. | 48/202 |

*Primary Examiner*—S. Leon Bashore
*Assistant Examiner*—Peter F. Kratz
*Attorney, Agent, or Firm*—James E. Reed

[57] ABSTRACT

A water-soluble alkali metal compound or other soluble constituent is recovered from a mixture of solid particles of different densities and the solid particles are simultaneously separated into two fractions, one having a greater density than the other by countercurrently contacting the solids with a leaching agent in which said constituent is soluble in a countercurrent multistage leaching system, maintaining the density of the enriched leaching agent in the final stage of the system at a value intermediate the densities of the particles in the mixture, and separately recovering enriched leaching solution, particles having a density greater than that of the enriched leaching solution, and particles with a density less than that of the enriched solution from the system. The process is particularly useful for the recovery of alkali metal constituents used to catalyze the gasification of coal and other carbonaceous solids.

13 Claims, 3 Drawing Figures

ALKALI METAL CATALYST RECOVERY PROCESS

BACKGROUND OF THE INVENTION

1. Field of the Invention

This invention relates to the recovery of soluble constituents from mixed solids by leaching and is particularly concerned with the recovery of alkali metal compounds from carbonaceous solids produced during the gasification of coal and in similar processes.

2. Description of the Prior Art

It is known that potassium carbonate and other alkali metal compounds catalyze the gasification of coal and similar carbonaceous solids and that such compounds can also be used to advantage in coal liquefaction, coal carbonization, and related processes. To secure the higher reaction rates made possible by the presence of alkali metal compounds in such processes, it has been suggested that bituminous coal, subbituminous coal, lignite, petroleum coke, oil shale, organic wastes, and similar materials be mixed or impregnated with potassium, cesium, sodium or lithium compounds before such materials are reacted with steam, hydrogen, oxygen or other agents at elevated temperatures. Studies have shown that a wide variety of different alkali metal compositions can be used for this purpose, including both organic and inorganic salts, oxides, hydroxides and the like. Because of their relatively low cast, the inorganic salts such as potassium carbonate are generally preferred.

Gasification and similar processes carried out in the presence of alkali metal catalysts at temperatures below about 2200° F. generally result in the formation of chars and alkali metal catalyst residues. The chars include unconverted organic constituents of the coal or other feed material and inorganic constituents normally referred to as ash. The amount of ash present depends upon the composition of the feed material, the gasification or other reaction conditions employed, and the residence time of the particles in the reaction zone. It is common practice to withdraw a portion of the char from the reaction zone in order to eliminate the ash and keep it from building up within the gasifier or other reaction vessel. Elutriation methods and other techniques for separating char particles of relatively high ash content and returning particles of relatively low ash content to the reaction zone in order to improve the utilization of carbon in such processes have been suggested.

It has been proposed that alkali metal catalyst residues withdrawn from the reaction zone with the char during coal gasification and similar operations be recovered for reuse by leaching out the alkali metal constituents. Studies indicate that these constituents are generally present as carbonates or other water-soluble compounds which can be readily recovered by waterwashing. Because of the limited extent to which alkali metal catalysts have been used, however, there has been relatively little work done in this area.

SUMMARY OF THE INVENTION

This invention provides an improved process for the recovery of alkali metal catalyst residues or other soluble constituents from mixtures of coal char and ash or similar mixed solids and at the same time separating the solids into two fractions according to density. In accordance with the invention, it has now been found that the soluble constituent can be leached from such a mixture of two or more solids having different densities to produce an enriched leaching agent which has a density intermediate those of the solids and that this enriched leaching agent can be employed to permit the simultaneous separation of particles having densities less than that of the enriched leaching agent from particles with densities greater than that of the leaching agent. By feeding solids containing coal char, ash and alkali metal catalyst residues produced in a coal gasification process or similar operation, for example, into the final stage of a countercurrent multistage leaching system in which an aqueous leaching agent is added to the initial stage and an enriched leaching agent containing water-soluble alkali metal compounds is recovered from the final stage and maintaining the density of the enriched solution in the final stage at the proper level, an effective separation between char particles which contain significant quantities of carbon and can be recycled for further reaction and particles which consist primarily of ash and contain relatively little carbon can be made. This recovery and recycle of the carbon-containing material improves the overall efficiency and economics of the process and may alleviate environmental problems and other difficulties sometimes associated with the disposal of such material.

The countercurrent multistage leaching or liquid-solids extraction system employed in accordance with the invention includes a series of interconnected mixing tanks provided with wiers, liquid level controllers or other means for maintaining the proper liquid level in each tank. Each of these tanks includes a baffled inlet section into which liquid from the preceding tank is discharged and an outlet through which slurry containing suspended solids is withdrawn. The withdrawn slurry from each tank is pumped to a separate hydroclone, centrifuge or other liquid-solids separator where it is separated into a liquids stream and a solids stream. The liquids are passed to the next tank in one direction and the solids are discharged into the next tank in the other direction. Liquid thus flows through the series of tanks in a direction countercurrent to the movement of solids. Water or other leaching agent is introduced into the terminal tank at one end of the series and solids of low carbon content consisting substantially of ash are recovered from the hydroclone associated with that tank. At the other end of the series, mixed solids of high alkali metal content are introduce into the terminal tank and a rich alkali metal solution is recovered from the associated hydroclone or similar device for recycle to the gasification or other process. Because of the high water solubility of the alkali metat catalyst residues, this countercurrent contacting system permits recovery of substantially all of the alkali metal constituents introduced as catalyst into the gasifier or other high temperature reactor with the feed material so that it can be reused. It also rejects spent ash from the system and makes possible the recovery of valuable char from the solids leaving the gasifier or other reactor. As a result, the process of the invention has numerous advantages over processes considered in the past.

DESCRIPTION OF THE PREFERRED EMBODIMENTS

Figure 1:
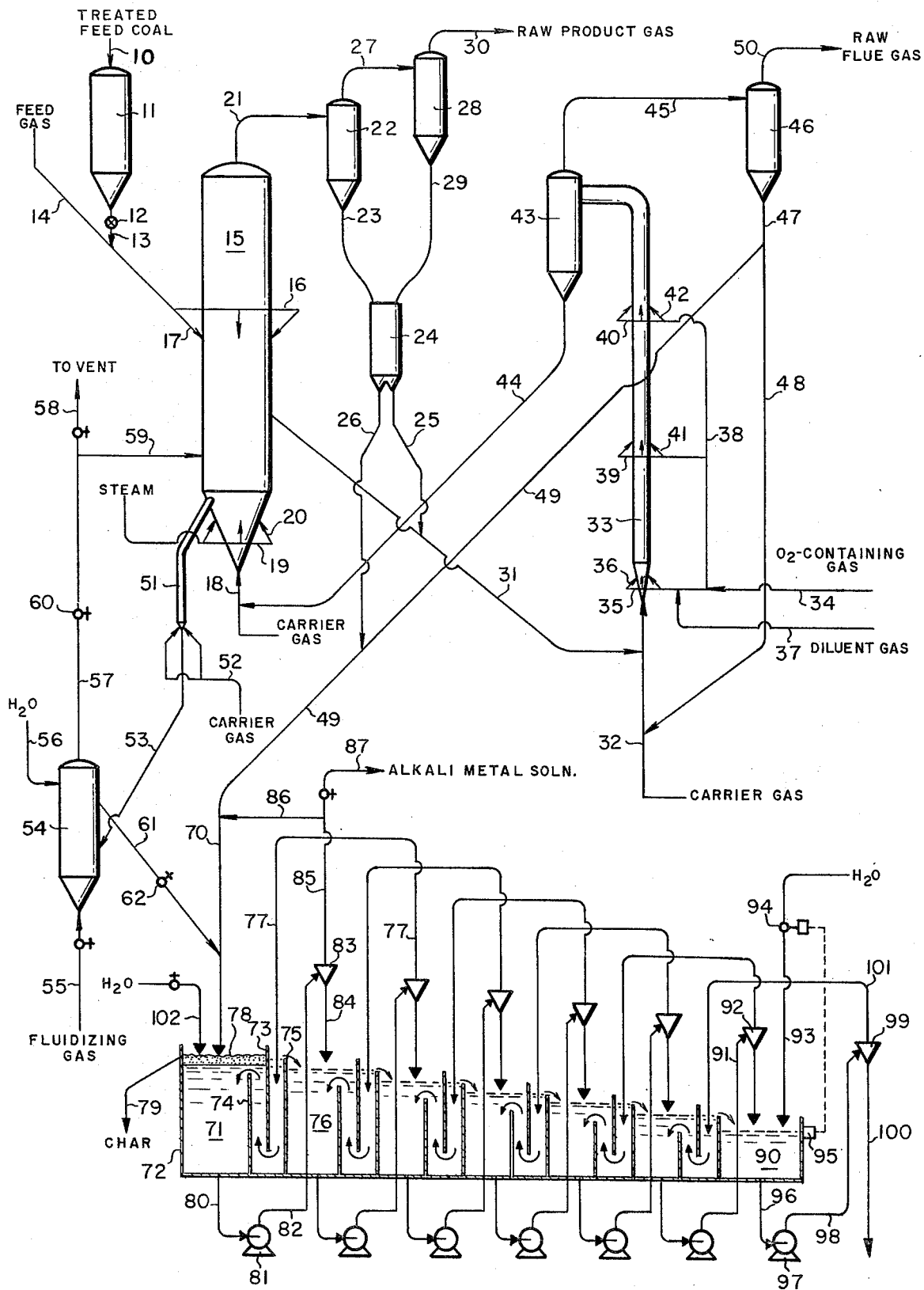
FIG. 1 in the drawing is a schematic flow diagram of a catalytic coal gasification process in which alkali metal catalyst constituents are recovered for reuse in accordance with the invention.

The process depicted in FIG. 1 of the drawing is a gasification process for the production of a product gas stream of relatively high methane content by the treatment of bituminous coal, lignite or similar carbonaceous material with steam at high temperatures in which potassium carbonate or a similar alkali metal compounds is employed to accelerate the rate at which the carbonaceous feed material is gasified. It will be understood that the invention is not restricted to use with this particular process and that it can be employed in conjunction with any of a variety of processes in which alkali metal catalysts are used to promote the reaction of steam, hydrogen, oxygen or the like with carbonaceous feed materials and a char, coke or similar solid product containing alkali metal catalyst residues is recovered. It can be utilized, for example, for the recovery of alkali metal catalyst residues and the like from various processes for the gasification of coal, petroleum coke, lignite, organic waste materials and similar feed streams which produce carbonaceous solids at temperatures below the ash fusion point. Other processes with which it may be used include operations for the carbonization of coal and similar feed solids, for the gasification of petroleum coke and related carbonaceous feed materials, for the retorting of oil shales and the like, for the partial combustion of carbonaceous feed materials, and the like. Such processes will be failiar to those skilled in the art.

In the process shown in FIG. 1, a solid carbonaceous feed material such as bituminous coal, subbituminous coal, lignite or the like which has been crushed to a particle size of about 8 mesh or smaller on the Tyler Screen Scale, impregnated or mixed with potassium carbonate or a similar alkali metal compound, and dried if necessary in a feed preparation facility which does not appear in the drawing is fed into the system through line 10 from a preparation plant or a storage facility not shown in the drawing. The feed solids introduced through line 10 are fed into a closed hopper or similer vessel 11 from which they are discharged through a star wheel feeder or equivalent device 12 in line 13 at an elevated pressure sufficient to permit their introduction at the system operating pressure or a somewhat higher pressure. In lieu of or in addition to this particular equipment, parallel lock hoppers, pressurized hoppers, aerated standpipes operated in series, or other apparatus may be employed to raise the input feed solids stream to the required pressure level. A carrier gas stream is introduced into the system through line 14 to permit entrainment of the feed solids from line 13 and facilitate their introduction into gasifier 15. The carrier gas employed may be high pressure steam, recycle product gas, inert gas or the like and may be introduced into the system at a pressure between about 50 and about 2000 psig, depending upon the gasifier operating pressure and the solid feed material employed. The use of recycle product gas at a pressure between about 100 and about 1000 psig is generally preferred. The gas may be preheated to a temperature in excess of about 300° F. but below the initial softening point of the coal or other feed material if desired. The feed particles are suspended in the carrier gas in a concentration between about 0.2 and about 5.0 pounds of solid feed material per pound of carrier gas. The optimum ratio for a particular system will depend in part upon the feed particle size and density, the molecular weight of the gas employed, the temperature of the solid feed material and input gas stream, the amount of alkali metal compounds employed, and other factors. In general, ratios between about 0.5 and about 4.0 pounds of solid feed material per pound of carrier gas are preferred. The solids and accompanying gas are normally passed into the gasifier through a manifold 16 and a plurality of peripherally spaced injection lines 17. Injection nozzles fluid cooled with steam, water or the like may be employed if desired. The number of injection lines and nozzles used will depend in part upon the gasifier diameter, the feed rates, and other factors and may be varied as necessary.

The gasifier employed in the system of FIG. 1 comprises a refractory-lined vessel containing a fluidized bed of char particles introduced into the lower portion of the vessel above an internal grid or similar distribution device not shown through bottom inlet line 18. Steam for maintaining the char particles in a fluidized state and reacting with the char to produce a synthesis gas containing methane, hydrogen and carbon monoxide is introduced into the lower portion of the gasifier below the grid through manifold 19 and steam injection lines 20. The steam thus introduced will normally be fed into the system at a rate between about 0.5 and about 2.0 pounds of steam per pound of solids feed. The upflowing steam and suspended char particles form a fluidized bed which extends upwardly in the gasifier to a level above that at which the coal or other solid feed particles are introduced. The upper surface of this fluidized bed will normally be located a sufficient distance below the upper end of the gasifier to permit disengagement of the heavier char particles that may otherwise tend to be entrained with the steam and gases leaving the bed. The temperature within the fluidized bed will generally range between about 1000 and about 1950° F. but temperatures outside this range may in some cases be used. Depending upon the feed solids employed and the desired composition of the product gas, the level at which the feed solids are introduced into the fluidized bed may be varied and in some cases it may be advantageous to introduce the feed into the lower portion of the bed rather than at an intermediate level as shown in the drawing. In general, the gas velocities in the fluidized bed will normally range between about 0.2 and about 2.0 feet per second or more.

The raw product gas produced in the fluidized bed of gasifier 15 will normally contain methane and may include substantial quantities of hydrogen, carbon monoxide, carbon dioxide, water vapor, unreacted steam, hydrogen sulfide and the like. This gas is withdrawn from the gasifier through overhead line 21 and passed to a cyclone separator or equivalent device 22 where the larger entrained solids are removed from the gas. In lieu of an external separator as shown in the drawing, the gasifier may contain one or more internal cyclones or similar devices for the removal of entrained solids from the upflowing gas stream. The solids removed from the gas in separator 22 are conveyed downwardly through dip leg 23 into collection vessel 24, from which they may be withdrawn as a dense phase stream through line 25 for reinjection to the gasification system or through line 26 for the recovery of high carbon constituents and the elimination of ash as described hereafter. Studies have shown that a major portion of the ash produced in this particular tyoe of gasification system is withdrawn as fines and hence the processing of this material for elimination of the ash may be advantageous. The overhead gas from the separation unit 22 is passed through line 27 to a second separation unit 28 where additional entrained fine solids are removed. These particles are discharged by means of dip leg 29 into vessel 24 and again may be withdrawn through either line 25 or 26. The raw product gas taken overhead from separation unit 28 through line 30 may be treated for the recovery of heat and the removal of acid gases and other undersirable constituents and then employed as a low heating value fuel gas, further processed to permit the recovery of hydrogen for use in coal liquefaction or other operations, upgraded into a product gas of higher Btu content, or after a suitable processing be employed as a feed stream for a Fischer-Tropsch or similar unit designed for the production of liquid hydrocarbons.

Heat for the gasification process shown in FIG. 1 is generated by continuously withdrawing char particles from the fluidized bed in the lower portion of gasifier 15 by means of line 31, passing these particles and fines from dip leg 25 into an upflowing stream of carrier gas introduced into the system through line 32, and injecting this stream into the lower end of a transfer line burner 33. The carrier gas employed may be recycled flue gas, inert gas or the like. An oxygen-containing gas, normally air, is introduced into the system through line 34 and injected into the lower end of the burner through manifold 35 and peripherally spaced injection lines 36. It is generally preferred to dilute the oxygen containing gas introduced at the bottom of the burner with recycled flue gas or inert gas introduced through line 37 so that the oxygen content of the gas airing the burner at this point is about 15% or less, normally less than about 6%. Additional oxygen-containing gas, generally air, is introduced into the upward portion of the burner through line 38, manifolds 39 and 40, and peripherally spaced injection lines 41 and 42. The combustion of carbon as the solids move upwardly through the burner in the presence of the oxygen-containing gas results in heating of the solid particles to a temperature in excess of that within the gasifier.

Generally it is preferred to control the operation of the transfer line burner in the system of FIG. 1 so that the solid particles leaving the upper end of the unit have a temperature of from about 50° to about 300° F. above the fluidized bed temperature in gasifier 15. The solids leaving the burner enter cyclone separator or similar device 43 where the larger particles are removed from the gas and conveyed downwardly through line 44 for reintroduction into the gasifier with the carrier gas introduced through line 18. These recycled hot solids thus provide heat for the endothermic reactions taking place within the gasifier. The overhead gases from separation unit 43 are passed through line 45 to a second separation unit 46 where entrained fine solids are removed and conveyed downwardly through dip leg 47. These particles, which will generally include both ash constituents and constituents containing substantial quantities of carbon, may be passed through line 48 for recycle to the burner with the solids in the carrier gas supplied through line 32 or may instead be withdrawn through line 49 for separation of the high carbon and high ash constituents as described hereafter. The raw flue gas taken overhead from separation unit 46 through line 50 may be processed for the recovery of heat and the removal of pollutants and other undesirable constituents and then discharged into the atmosphere or employed in various process applications. It will be understood that the system of the invention is not restricted to gasification operations using a transfer line burner as described above and may instead be employed with gasification processes which utilize fluidized bed heaters or other combustion zones in lieu of a transfer line burner. It also has application to catalytic gasifiction processes in which both endothermic and exothermic reactions occur and tend to balance one another so that an external combustion zone is not needed. Furthermore, the invention can be used in conjunction with gasification processes in which oxygen is introduced into the gasifier to supply the required heat in lieu of employing a transfer line burner, a fluidized bed heater or other external combustion zone.

In lieu of or in addition to withdrawing ash-containing constituents from the system by the separation of solids from one or more gas streams as described above, ash-containing particles may be withdrawn from the system by continuously or intermittently withdrawing char particles from gasifier 15. Although this may be accomplished in several different ways, a convenient and effective method is to continuously discharge a stream of hot char particles through a line 51 extending downwardly from a point within the fluidized bed. A stream, inert gas, recycle product gas or the like may be introduced through line 52 and one or more associated nozzles at a pressure and in quantities such that elutriation of the downflowing particles in line 51 takes place. The lighter, low density particles of relatively high carbon content will be entrained by the upflowing gas and returned to the fluidized bed; while the heavier particles of higher ash content will settle through the upflowing elutriating gas and thus be withdrawn from the system. This can be employed to effect a preliminary separation between high ash and high carbon content particles and is often advantageous. The use of such a system is not, however, essential for purposes of the invention and may often be omitted.

The particles which are withdrawn through line 51 pass downwardly through line 53 as a dense phase stream and are fed into fluidized bed solids withdrawal vessel 54. The particles in vessel 54 are maintained in the fluidized state by means of steam, inert gas, recycle gas or the like introduced upwardly into the bed through line 55 and an internal grid or other distribution device not shown in the drawing. The hot char particles in the fluidized bed in vessel 54 will normally be cooled to a temperature below about 200° F. by the introduction of water into the upper part of the vessel through line 56. The amount of cooling required will depend, of course, on the temperature of the solids entering the vessel and if necessary additional means for the recovery of heat and cooling of the solids may be provided. It is preferred to regulate the rate at which the solids are withdrawn from the gasifier by controlling the pressure in vessel 54. This can be done by using control valve 60 to throttle the gas taken overhead through line 57, thus avoiding the necessity for passing high temperature solids through a slide valve or similar device. Solids are continuously discharged from vessel 54 through line 61 containing control valve 62. If necessary this stream of solids may be passed into a cooling vessel not shown in the drawing to further lower the temperature of the solid particles to a level below about 200° F. before it is passed to the alkali metal catalyst residue recovery unit employed in accordance with the invention.

The solid particles from which potassium carbonate or other alkali metal catalyst constitutents are to be recovered in accordance with the invention may include solids withdrawn from vessel 54 through line 61, fines recovered from the product gas stream through line 26, solids removed from the flue gas and recovered through line 49, or a combination of these. These particles are introduced into the recovery unit by injecting them into a stream of concentrated alkali metal solution in line 70. The resulting slurry of liquid and solids is then discharged into the final stage 71 of the multistage liquid solids extraction train. This stage comprises a mixing tank 72 containing internal baffles 73 and 74 and an overflow wier 75, a liquid level controller, or other means for maintaining the proper liquid level in the tank. Alkali metal solution less concentrated than that in the final stage is introduced into stage 71 from the preceding stage 76 through line 77. This liquid flows downwardly around baffle 73 and upwardly around baffle 74 into contact with solids from the gasification system. Char particles or relatively high carbon content and relatively low ash content which are less dense than the liquid rise to the surface to form a char layer 78 which is skimmed off or withdrawn as indicated by line 79 for recycle to the gasification system or use for other purposes. The heavier particles of relatively low carbon content and relatively high ash content are more dense than the liquid in tank 72 and therefore form a slurry in the liquid. Water-soluble alkali metal constituents present in the solid particles are in part extracted by the liquid in contact with the particles. If desired, stage 71 and the other stages in the extraction system may be provided with mechanical agitators to improve the contacting efficiency and increase the amount of extraction or leaching which takes place.

The slurry formed in tank 72 is withdrawn from the bottom of the tank through line 80 and circulated by means of pump 81 through line 82 to a hydroclone, a centrifuge, a filter, or a similar liquid-solids separation device 83 where the solids are removed from the liquid. These solid particles, from which a portion of the water-soluble alkali metal constituents have been extracted, are discharged through line 84 into stage 76 of the apparatus. The liquids separated from the solids in hydroclone 83, richer in alkali metal constituents than the liquid in stage 76, are withdrawn from the hydroclone through line 85. A portion of this concentrated solution is recycled through line 86 for mixing with the incoming solids and the rest is withdrawn through line 87 for recovery and reuse. The concentrated solution will normally be pumped to the feed solids preparation facility not shown in the drawing to impregnate the coal or other solid feed material. If desired, however, alkali metal constituents can be separated from the concentrated solution by evaporation and crystallization, precipitation or other methods and added to the feed solids in solid form. It is generally preferred to employ the solution to impregnate the feed material and omit recovery of the alkali metal constituents as solids.

Stage 76 and the other intermediate stages of the recovery train are generally similar to stage 71. In each of these stages, solids separated from a relatively concentrated liquid stream in the hydroclone or other liquid-solids separator associated with that stage are discharged into a less concentrated solution and the concentrated solution from the hydroclone or similar device is passed downstream for contact with solids having a higher alkali metal residues content. Slurry from each stage is pumped to the hydroclone in the adjacent upstream stage for separation into liquid and solid components. In the initial stage 90 of the train, incoming slurry from the second stage flows through line 91 to hydroclone or the like 92, from which the solids are discharged into substantially pure water introduced into the system through line 93 containing automatic valve 94 which is connected to a liquid level detector 95. This controls the amount of water introduced through line 93 and prevents overflow of the liquid.

The slurry formed in the initial stage by the mixing of solids from which most of the alkali metal catalyst residues have been extracted and substantially pure water results in a slurry of solid particles in a very dilute alkali metal solution. This slurry is withdrawn through line 96 by means of pump 97 and passed through line 98 to hydroclone or similar device 99. The solids withdrawn from the hydroclone through line 100 consist primarily of ash, contain little carbon, and have very low alkali metal catalyst residue content. These solids may be disposed of by land fill, used for construction purposes, or employed in other applications. The very dilute alkali metal solution recovered from hydroclone 99 is passed through line 101 to the second stage of the recovery train. It will thus be apparent that the process of the invention provides a means for the recovery of alkali metal catalyst constituents from the carbonaceous solids produced during coal gasification and similar operations, provides a means for the recovery of valuable char produced during such operations, and permits the rejection of ash which would otherwise tend to build up in the process or require the discharge of materials of higher carbon content to keep down the ash concentration in the system. In some cases it may be necessary to add additional water to the terminal stage of the system. This can be added through line 102.

Figure 2:
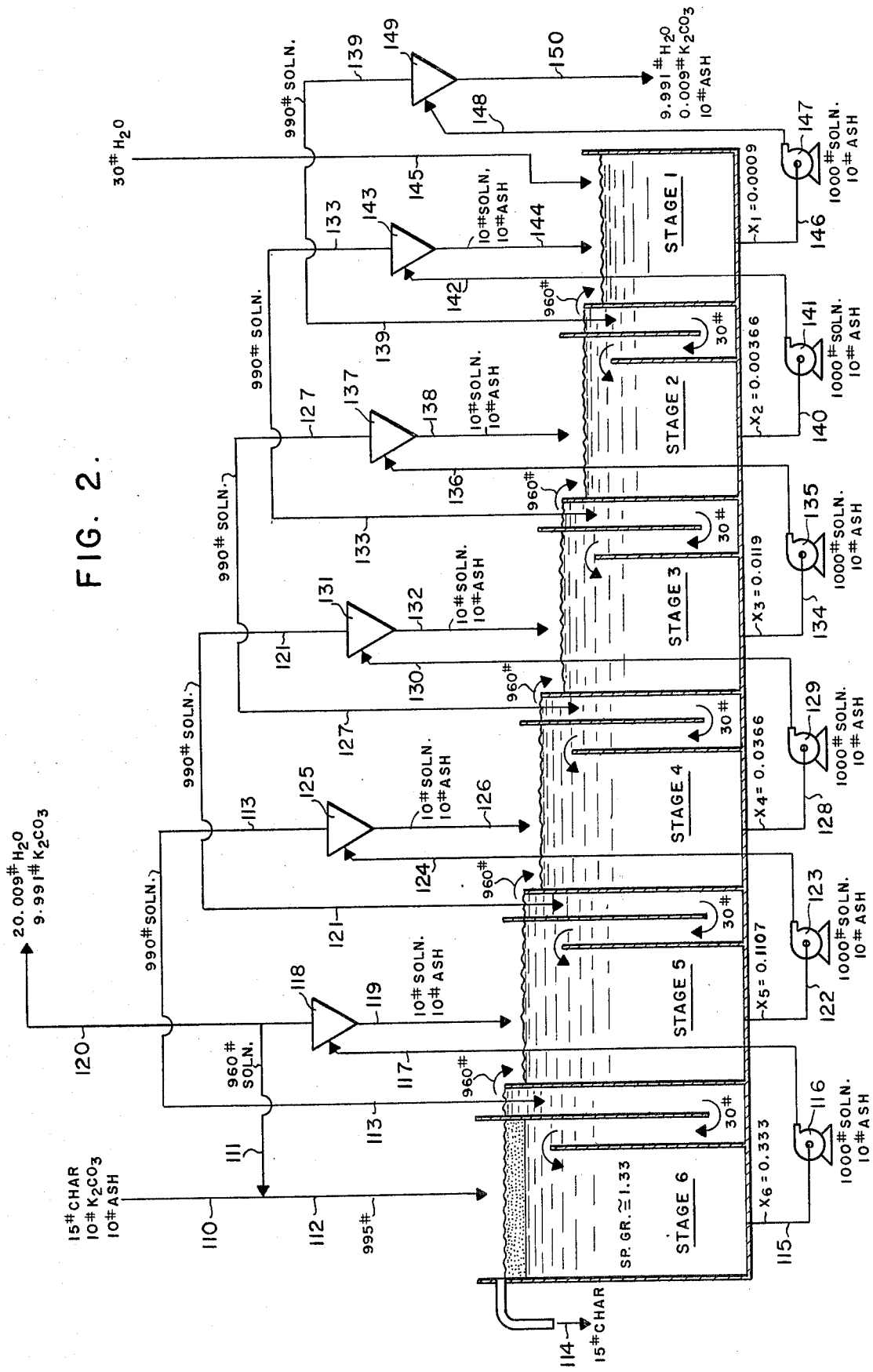
FIG. 2 is an enlarged schematic diagram of an alkali metal catalyst recovery system further illustrating the movement of liquid and solids through the system.

FIG. 2 in the drawing is an enlarged schematic diagram further illustrating the movement of solids and liquids through the alkali metal recovery unit of the invention. The system shown in FIG. 2 is a six-stage unit. For purposes of illustration, it is assumed that 35 pounds of solids are fed to the recovery unit per 100 pounds of fresh coal fed to the gasifier and that these solids are composed of 15 pounds of char, 10 pounds of potassium carbonate, and 10 pounds of ash. The invention is not restricted, of course, to this particular solids system or feed rate. The solids enter the system of FIG. 2 through line 110 and are mixed with 960 pounds of potassium carbonate solution added through line 11 to give a total of 995 pounds of slurry discharged into the terminal stage 6 of the system through line 112. Also introduced into stage 6 is 990 pounds of potassium carbonate solution from stage 5 through line 113. Of this 990 pounds, 960 pounds will overflow into stage 5 and 30 pounds will flow around the baffle in stage 6 and mix with the slurry contained therein. Assuming complete mixing and solubility equilibria in each stage of the system, the slurry in stage 6 will have a specific gravity of about 1.33. The char contained in the solids supplied to stage 6 through line 112 will tend to form a layer on top of the slurry, while the ash particles will remain in the slurry. There will therefore be 15 pounds of char removed from stage 6 through line 114. It will be understood, of course, that the char fraction withdrawn will contain some ash and that the ash fraction retained will include some char. Slurry containing 1000 pounds of potassium carbonate solution and 10 pounds of ash is withdrawn from stage 6 through line 115. The mass fraction of potassium carbonate in the solution leaving stage 6 will be 0.333. This solution is pumped by means of pump 116 and line 117 into hydroclone 118. Here the solids are removed from the solution and a concentrated slurry containing 10 pounds of solution and 10 pounds of ash is discharged into stage 5 through line 119. The complete removal of the solids in the hydroclone is assumed for purposes of this calculated example. The overhead stream from hydroclone 118 will consist of 990 pounds of the potassium carbonate solution. Thirty pounds of this solution, including about 20 pounds of water and about 10 pounds of potassium carbonate, is withdrawn from the recovery unit through line 120 for use in impregnating feed coal to the gasification process. The remaining 960 pounds of solution is recycled through line 111. It should be apparent that the system is not limited to this high recycle rate and can be designed to permit the withdrawal of smaller amounts of slurry, the recycle of less solution, and the overflow of smaller volumes of liquid between stages, particularly if relatively small hydroclones which do not require high slurry throughputs or if centrifuges, filters or the like are used in place of hydroclones.

Stage 5 of the recovery unit is fed with 990 pounds of potassium carbonate solution from stage 4 through line 121 in addition to the 960 pounds of overflow from stage 6 and the 20 pounds of concentrated slurry introduced through line 119. Of the 990 pounds of solution introduced by way of line 121, 960 pounds overflows into stage 4 and 30 pounds flows into and mixes with the slurry in stage 5. The slurry withdrawn from this stage through line 122 will contain 0.1107 mass fraction of potassium carbonate. This slurry is circulated by means of pump 123 and line 124 to hydroclone 125. A concentrated slurry of 10 pounds of potassium carbonate solution and 10 pounds of ash is discharged through line 126 into stage 4. The overhead liquid from hydroclone 125, 990 pounds of potassium carbonate solution, is recycled through line 113 to stage 6. Of the 990 pounds of solution supplied to stage 4 through line 127, 960 pounds overflows into stage 3 and 30 pounds mixes with the slurry in stage 4. One thousand ten pounds of slurry containing 10 pounds of ash and containing 0.0366 mass fraction of potassium carbonate in the solution is withdrawn from stage 4 through line 128 and pumped by means of pump 129 and line 130 into hydroclone 131. Ten pounds of solution and 10 pounds of ash are recovered as underflow from the hydroclone and discharged through line 132 into stage 3. The 990 pounds of overflow from hydroclone 131 is recycled through line 121 to stage 5. Of the 990 pounds of solution supplied to stage 3 through line 133, 960 pounds overflows to stage 2 and 30 pounds mixes with the slurry in stage 3. A total of 1010 pounds of slurry including 10 pounds of ash and containing 0.0119 mass fraction of potassium carbonate is withdrawn from stage 3 through line 134 and circulated by pump 135 and line 136 into hydroclone 137. Ten pounds of solution and 10 pounds of ash are discharged through line 138 in stage 2. A total of 990 pounds of solution is supplied to the stage 2 through line 139. Of this, 960 pounds again overflow and 30 pounds mix with the slurry in stage 2. A total of 1010 pounds of slurry, including 10 pounds of ash and containing a potassium carbonate mass fraction of 0.00366, is withdrawn through line 140 and pumped by means of pump 141 and line 142 into hydroclone 143. The underflow of 10 pounds of solution and 10 pounds of each from hydroclone 143 is introduced into stage 1 through line 144. The overflow, 990 pounds of solution, is recycled to stage 3 through line 133. A total of 30 pounds of water is added to the slurry in stage 1 through line 145. This slurry will contain 0.0009 mass fraction of potassium carbonate. A total of 1010 pounds of slurry including 10 pounds of ash is withdrawn from stage 1 through line 146 and circulated through pump 147 and line 148 to hydroclone 149. The overflow from hydroclone 149, 990 pounds of potassium carbonate solution, is recycled through line 139 to stage 2. The underflow, withdrawn through line 150, consists of 9.991 pounds of water, 0.009 pound of potassium carbonate, and 10 pounds of ash. Virtually all of the potassium carbonate fed to the recovery unit is thus recovered for reuse. Char and ash fed to the system are separated so that the char can also be recovered and reused.

Figure 3:
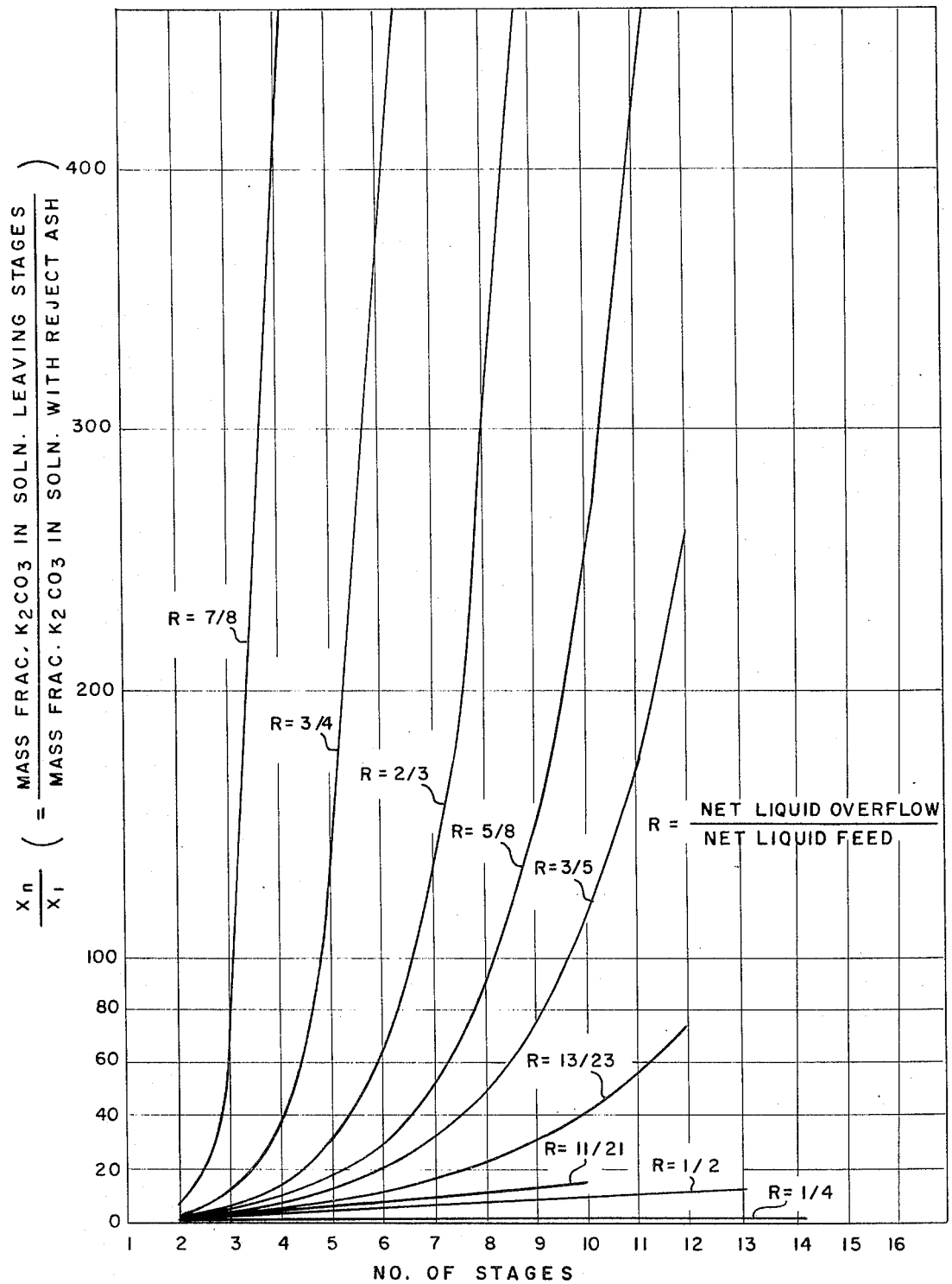
FIG. 3 is a plot showing the relationship between the number of stages in the system, the ratio of net overflow and underflow between stages and the ratio of potassium carbonate in the enriched solution to that in the solution discharged with the ash.

The recovery system shown in FIG. 2 of the drawing is a six-stage unit and the calculated values assume an overall enriched solution to water and potassium carbonate feed ratio of 0.75. The system is not, however, limited to any specific number of stages or ratio. Fig. 3 in the drawing is a plot showing the effect of varying the number of stages and the ratio of net product to net feed upon the ratio of potassium carbonate in the enriched solution to potassium carbonate in the solution discharged from the system with the ash. It can be seen from FIG. 3 that the recovery of potassium carbonate increases with the number of stages employed and that at high net product to net feed ratios only a relatively small number of stages is required. The data plotted in FIG. 3 assume equal pump rates on a weight basis in each stage, assume that all of the ash is transferred to the underflow in each stage, and assume that equilibrium solubility exists in each stage. Since not all of the ash will be transferred to the underflow and perfect dilution in each stage cannot be attained, an actual operating system will be somewhat less effective than indicated by the plotted values. It should also be noted that the plotted data are based on potassium carbonate. The process of the invention is not restricted to potassium carbonate and can be employed with any of a variety of highly water soluble alkali metal compounds. Solubility data for other alkali metal compounds are readily available and can be used for the preparation of plots similar to that of FIG. 3.

It should also be noted that the invention is not limited to the use of water as the leaching agent and can instead be carried out with dilute sulfuric acid, methanol, or a similar solution in which the alkali metal compound or other constituent to be recovered is soluble. Similarly, it may be used for the recovery of any highly soluble material which is present in a mixture of two or more solids, one of which contains the soluble material and has a density greater than that of the enriched leaching solution and the other of which has a density less than that of the enriched solution, and is therefore not limited to the treatment of carbonaceous solids containing a soluble alkali metal constituent and ash. Equipment other than that specifically illustrated in the drawing can also be used, including vertically stacked multistage equipment in which each stage is filled with solution and control of the liquid level in each stage is therefore not required. These and other modifications of the specific system shown will be apparent to those skilled in the art from the above disclosure.

We claim:

1. A process for the recovery of alkali metal catalyst residues from a mixture of solid particles containing said alkali metal catalyst residues, carbonaceous solids, and particles of high ash content and for simultaneously separating said carbonaceous solids and particles of high ash content which comprises introducing said mixture of solid particles into the final stage of a countercurrent multistage leaching system having an initial stage and a final stage; introducing an aqueous leaching agent into said initial stage of said leaching system; passing particles of high ash content having densities greater than that of said leaching agent in said final stage and said leaching agent countercurrently through said leaching system; withdrawing particles of high ash content which have densities greater than that of said leaching agent in said final stage and are substantially depleted of alkali metal catalyst residues soluble in said leaching agent from said initial stage of said system; withdrawing leaching agent enriched in alkali metal catalyst residues soluble in said leaching agent from said final stage of said system; maintaining the density of the enriched leaching agent within said final stage at an intermediate value between the density of said carbonaceous solids and said particles of high ash content in said mixture of solid particles introduced into said final stage; and separately recovering carbonaceous solids having densities less than that of said leaching agent in said final stage from said final stage.

2. A process as defined by claim 1 wherein said leaching agent is water.

3. A process as defined by claim 1 wherein said leaching agent is a dilute sulfuric acid solution.

4. A process as defined by claim 1 wherein said leaching system includes a plurality of intermediate stages between said initial stage and said final stage and wherein a slurry of leaching solution and particles of high ash content is withdrawn from each of said intermediate stages, particles of high ash content are separated from the slurry from each intermediate stage and passed to the next preceding stage, and leaching agent in the slurry from each intermediate stage is passed to the next following stage.

5. A process as defined by claim 4 wherein said particles of high ash content are separated from said slurry by means of hydroclones.

6. A process as defined by claim 4 wherein a portion of the leaching agent passed from each intermediate stage to the next following stage is returned by overflow from said following stage to said intermediate stage.

7. A process as defined by claim 1 wherein said carbonaceous solids comprise coal char.

8. A process as defined by claim 1 wherein said mixture of solid particles comprises fines recovered from a gas produced by the gasification of carbonaceous solids in the presence of an alkali metal catalyst.

9. In a process for the production of a methane-containing gas wherein a carbonaceous solid is gasified in the presence of an alkali metal-containing catalyst, solids containing char particles, particles of high ash content, and alkali metal catalyst residues are produced, and alkali metal catalyst residues are recovered from said solids for reuse as a catalyst in the gasification process, the improvement which comprises introducing said solids into the final stage of a countercurrent multistage leaching system having an initial stage and a final stage; introducing an aqueous leaching agent into said initial stage of said leaching system; passing particles of high ash content having densities greater than that of said leaching agent in said final stage and said leaching agent countercurrently through said leaching system; withdrawing particles of high ash content which have densities greater than that of said leaching agent in said final stage and are substantially depleted of alkali metal catalyst residues soluble in said leaching agent from said initial stage of said system; withdrawing leaching agent enriched in alkali metal catalyst residues soluble in said leaching agent from said final stage of said system; maintaining the density of the enriched leaching agent within said final stage at a value greater than the densities of said char particles but at a value less than the densities of said particles of high ash content; separately recovering char particles which have densities less than that of said enriched leaching agent in said final stage of said system and therefore float on said enriched leaching agent in said final stage; and recycling the recovered char particles for reuse in said gasification process.

10. A process as defined by claim 9 wherein said char particles are coal char particles.

11. A process as defined by claim 9 wherein said gasification process employs a fluidized bed gasifier and said solids comprise particulates withdrawn from the lower portion of the fluidized bed in said gasifier.

12. A process as defined by claim 9 wherein said solids comprise fines recovered from said methane-containing gas.

13. A process as defined by claim 9 wherein said leaching agent comprises a dilute sulfuric acid solution.

* * * * *